(12) United States Patent
Takanashi (10) Patent No.: US 12,420,508 B2
(45) Date of Patent: Sep. 23, 2025

(54) TIRE MANUFACTURING METHOD AND MANUFACTURING SYSTEM

(71) Applicant: The Yokohama Rubber Co., LTD., Kanagawa (JP)

(72) Inventor: Yuta Takanashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 0 days.

(21) Appl. No.: 18/851,529

(22) PCT Filed: Dec. 12, 2022

(86) PCT No.: PCT/JP2022/045641
§ 371 (c)(1),
(2) Date: Sep. 26, 2024

(87) PCT Pub. No.: WO2023/188566
PCT Pub. Date: Oct. 5, 2023

(65) Prior Publication Data
US 2025/0108578 A1   Apr. 3, 2025

(30) Foreign Application Priority Data
Apr. 1, 2022   (JP) ................. 2022-061796

(51) Int. Cl.
*B29D 30/20*   (2006.01)
*B29D 30/08*   (2006.01)
*G01B 11/24*   (2006.01)

(52) U.S. Cl.
CPC ............ *B29D 30/20* (2013.01); *G01B 11/24* (2013.01); *B29D 2030/082* (2013.01); *B29D 2030/202* (2013.01)

(58) Field of Classification Search
CPC ............. B29D 30/20; B29D 2030/082; B29D 2030/202; G01B 11/24
USPC ................. 156/60, 64, 350, 351, 378, 379
See application file for complete search history.

(56) References Cited

U.S. PATENT DOCUMENTS

2006/0169392 A1\* 8/2006 Akiyama ............. B29D 30/005
                                                   156/111
2010/0032864 A1   2/2010 Marchini et al.
2010/0038016 A1\* 2/2010 Mancini ............. B29D 30/0601
                                                   156/111

(Continued)

FOREIGN PATENT DOCUMENTS

CN         111216388 A      6/2020
DE    10 2005 021979 A1    11/2006
JP         2003-515474 A    5/2003

(Continued)

*Primary Examiner* — Michael N Orlando
*Assistant Examiner* — Joshel Rivera
(74) *Attorney, Agent, or Firm* — Thorpe North & Western (57) ABSTRACT

Provided is a method of manufacturing a tire and a system for manufacturing a tire. A forming drum body to which a tire component is bonded after completion of a forming operation in an operation station is temporarily placed in a placement apparatus. While the forming drum body is temporarily placed in the placement apparatus, the mass of the green tire is inspected by a mass meter as a predetermined quality of a green tire formed by the tire component bonded to the forming drum body during forming or after completion of the forming, and the profile shape of the green tire is inspected by a profile sensor.

13 Claims, 9 Drawing Sheets

(56) References Cited

U.S. PATENT DOCUMENTS

2015/0239188 A1* 8/2015 Onimatsu ............ B29D 30/005
  156/379
2017/0190128 A1 7/2017 Sangiovanni et al.

FOREIGN PATENT DOCUMENTS

| JP | 2012-512072 A | 5/2012 |
| JP | 2015-536259 A | 12/2015 |
| JP | 2017 042971 A1 | 3/2017 |
| JP | 2017-533836 A | 11/2017 |
| JP | 2020-37205 A | 3/2020 |

* cited by examiner

TIRE MANUFACTURING METHOD AND MANUFACTURING SYSTEM

TECHNICAL FIELD

The present technology relates to a method of manufacturing a tire and manufacturing system, and particularly to a method of manufacturing a tire and manufacturing system that can efficiently form a green tire while understanding a predetermined quality when forming the green tire by sequentially moving a forming drum body to a plurality of operation stations.

BACKGROUND ART

A known method includes, in forming a green tire, sequentially moving an annular supporting member (forming drum body) to a plurality of workstations and bonding a tire component to the annular supporting member in each of the workstations (see, for example, Japan Unexamined Patent Publication No. 2003-515474 T). A robot arm is used to move the annular supporting member to the next workstation, and a holding station is installed between adjacent workstations. The robot arm disposed in the first workstation temporarily places the annular supporting member at the holding station installed between the first workstation and the second workstation. The robot arm disposed in the second workstation picks up the temporarily placed annular supporting member and moves it to the second workstation. The green tire is formed by sequentially moving the annular supporting member to the adjacent workstation through the holding station in this manner.

The green tire formed in the forming step is vulcanized in the vulcanization step and thus a tire is completed. This series of tire manufacturing processes needs to understand a predetermined quality of the green tire. This manufacturing method reduces the productivity of the tire as the period for which the forming drum body is temporarily placed in the holding station increases. However, completely eliminating the temporary placement period is impossible, requiring some temporary placement period. The temporary placement period may be longer depending on a production plan. As such, there is a room for improvement in efficiently forming the green tire while understanding the predetermined quality when forming a green tire by sequentially moving the forming drum body to the plurality of operation stations.

SUMMARY

The present technology provides a method of manufacturing a tire and manufacturing system that can efficiently form a green tire while understanding a predetermined quality when forming the green tire by sequentially moving a forming drum body to a plurality of operation stations.

A method of manufacturing a tire includes: forming a green tire by sequentially moving a forming drum body to a plurality of operation stations and bonding a tire component to the forming drum body in each of the operation stations; and vulcanizing the green tire. The method further includes: temporarily placing, at a placement apparatus, the forming drum body to which the tire component is bonded after completion of a forming operation at any one of the operation stations; and inspecting a predetermined quality for a green tire during forming or after completion of the forming while the forming drum body is temporarily placed in the placement apparatus.

A system for manufacturing a tire of the present technology includes: a forming drum configured to sequentially move to a plurality of operation stations; a member supplier disposed in each of the operation stations and configured to supply a tire component to the forming drum body; and a vulcanizing apparatus in which a green tire formed through a forming operation in each of the operation stations is vulcanized. The system further includes an inspection apparatus and a placement apparatus in which the forming drum body to which the tire component is bonded after completion of a forming operation in any one of the operation stations is temporarily placed. The inspection apparatus is configured to inspect a predetermined quality of a green tire during forming or after completion of the forming. The green tire is formed by the tire component bonded to the forming drum body temporarily placed in the placement apparatus.

According to the present technology, the predetermined quality for the green tire during forming or after completion of the forming is inspected while the forming drum body is temporarily placed in the placement apparatus, thus allowing the temporary placement period to be effectively utilized. Therefore, it is possible to efficiently form a green tire while understanding a predetermined quality when forming the green tire by sequentially moving a forming drum body to a plurality of operation stations. In turn, it is advantageous in terms of improvement in productivity of tires.

DETAILED DESCRIPTION

A method of manufacturing a tire and system of the present technology are described below based on embodiments with reference to the drawings.

Figure 1:
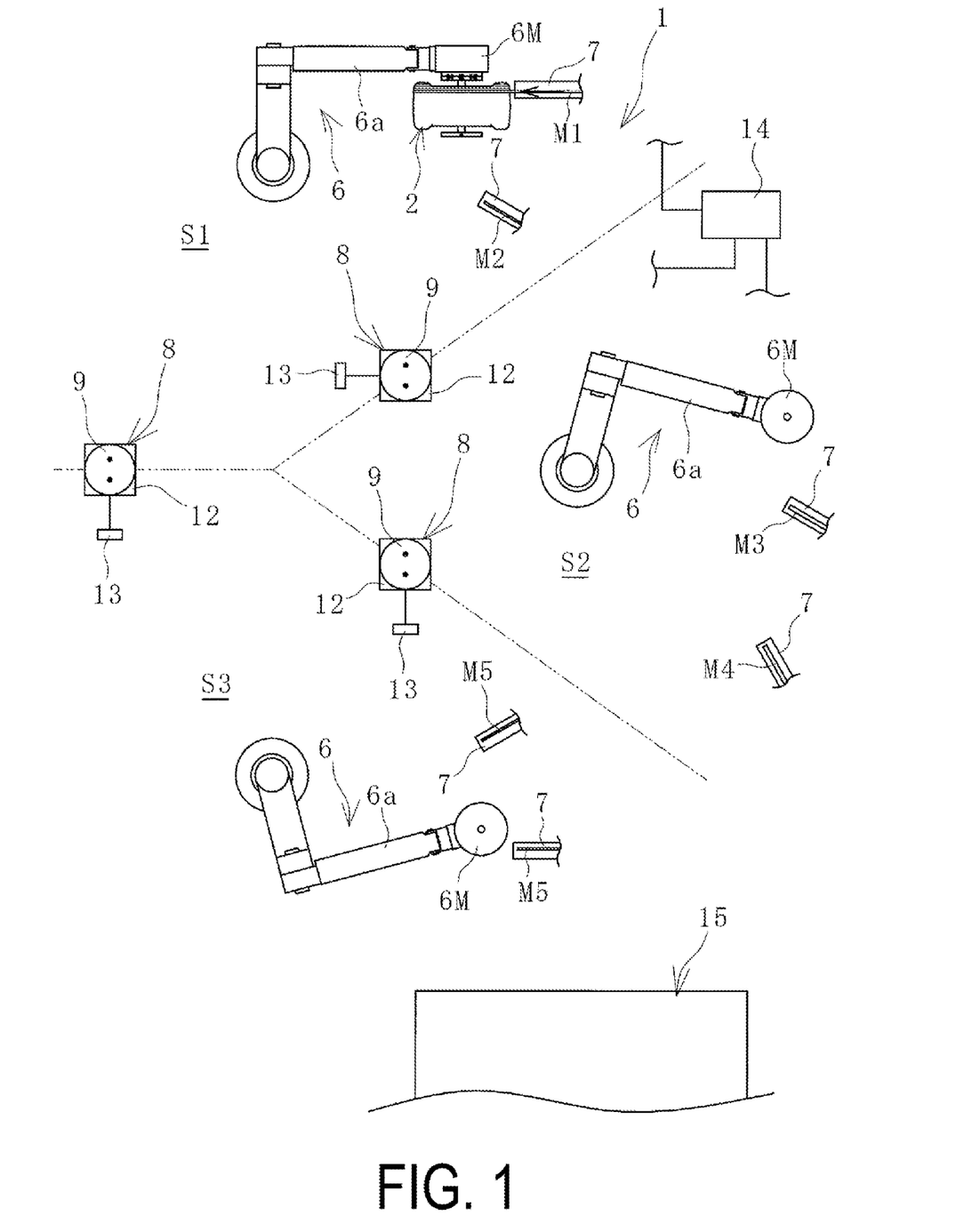
FIG. 1 is an explanatory diagram illustrating in plan view an example of a system for manufacturing a tire according to an embodiment.

A manufacturing system 1 for a tire of an embodiment exemplified in FIG. 1 includes a forming drum body 2 that sequentially moves to a plurality of operation stations S (S1, S2, S3), a member supplier 7 disposed in each of the operation stations S, a placement apparatus 8, a mass meter 12, a profile sensor 13, a control unit 14, and a vulcanizing apparatus 15.

A tire forming step includes the plurality of operation stations S1, S2, and S3. In FIG. 1, each of the operation stations S is indicated and defined with the chain double-dashed line. The number of operation stations S is not limited, and the necessary operation station S is provided in accordance with tire specifications and the like. A robot arm 6 is installed in each of the operation stations S, and the placement apparatus 8 is installed near the boundary between adjacent operation stations S (for example, the region between the operation stations S). The forming drum body 2 is mounted on the robot arm 6 that performs forming of a green tire G.

With various tire components M bonded and stacked, the forming drum body 2 functions as a core material when forming the green tire G. Publicly known various rigid cores may be used as the forming drum body 2, for example. In the present embodiment, a rigid core having an outer peripheral surface with the same profile as that of the inner surface of the tire T to be manufactured is used as the forming drum body 2.

Figure 2:
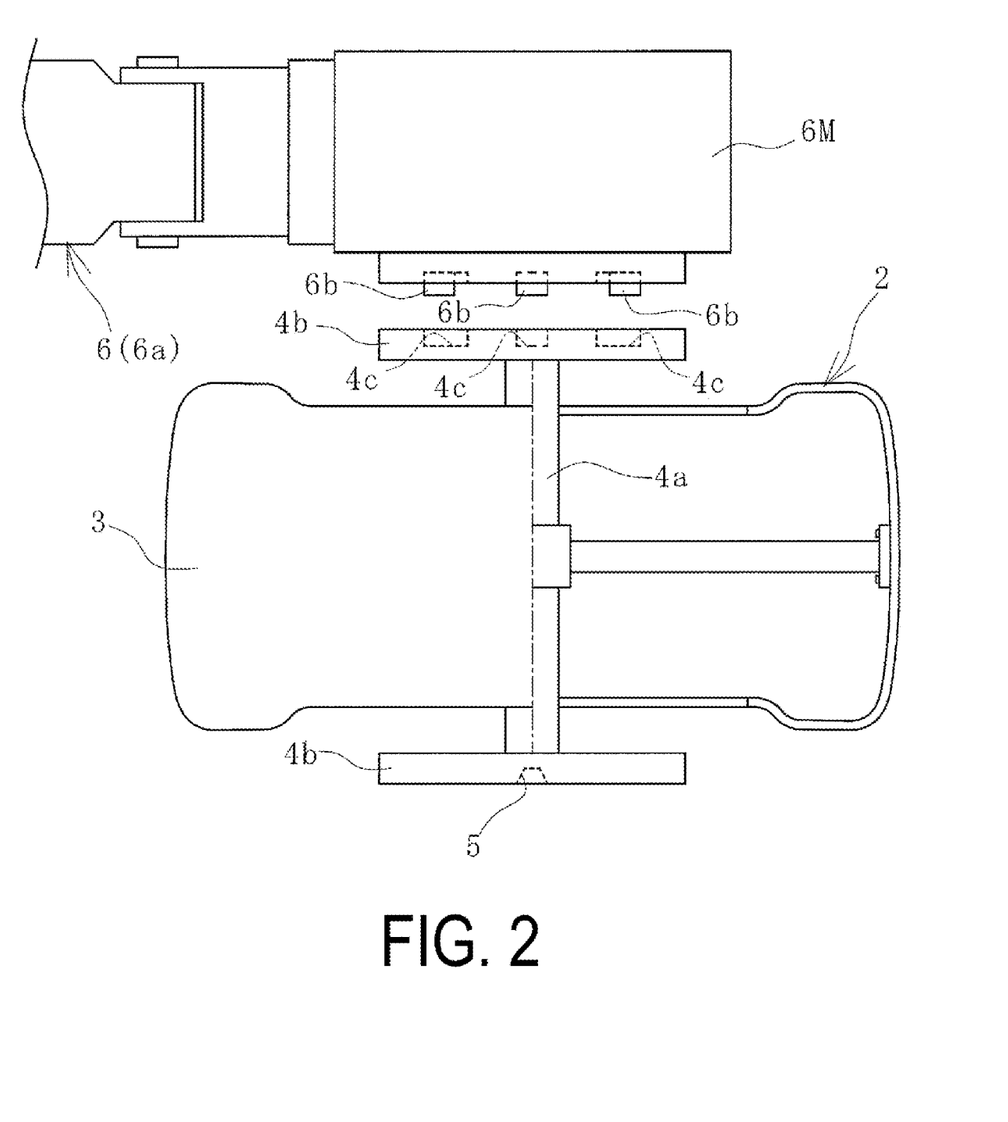
FIG. 2 is an explanatory diagram illustrating in side view an example of a state where a gripping claw of a robot arm is positioned above a connecting portion of a forming drum body.
Figure 3:
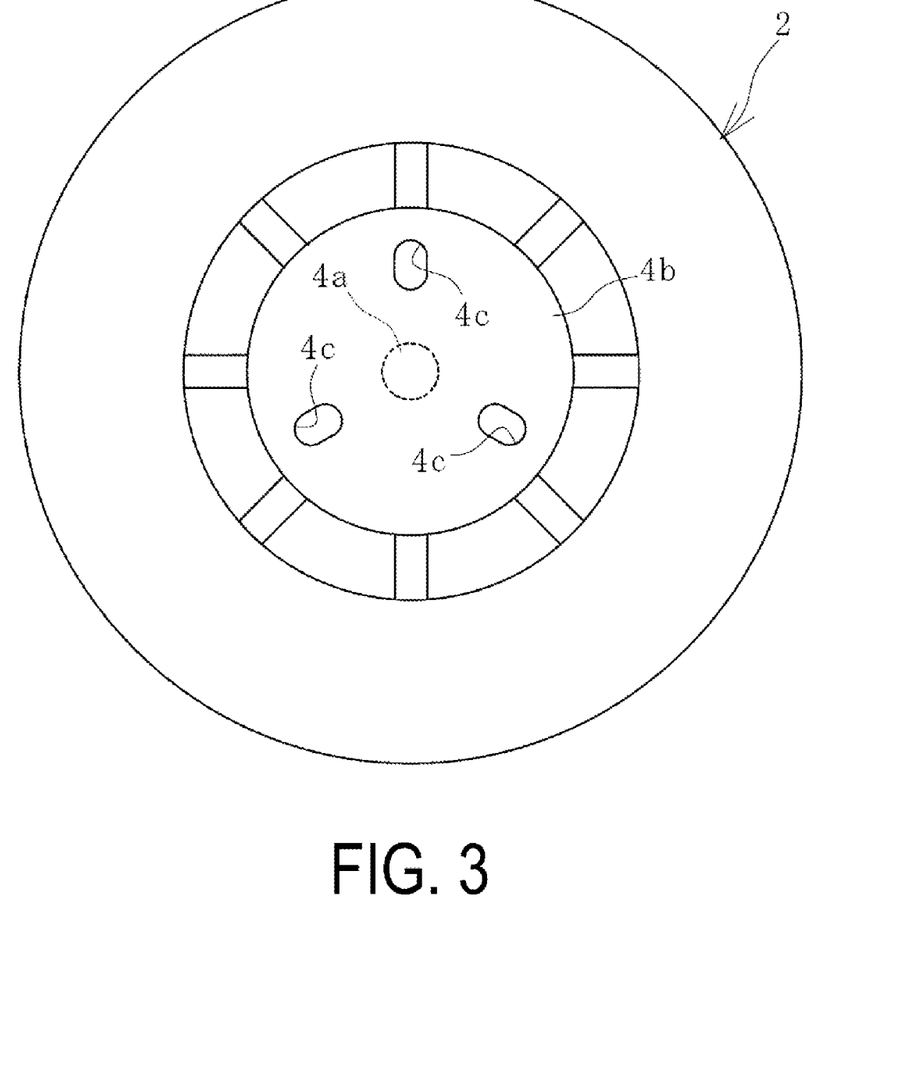
FIG. 3 is an explanatory diagram illustrating in plan view an example of the forming drum body of FIG. 2.
Figure 4:
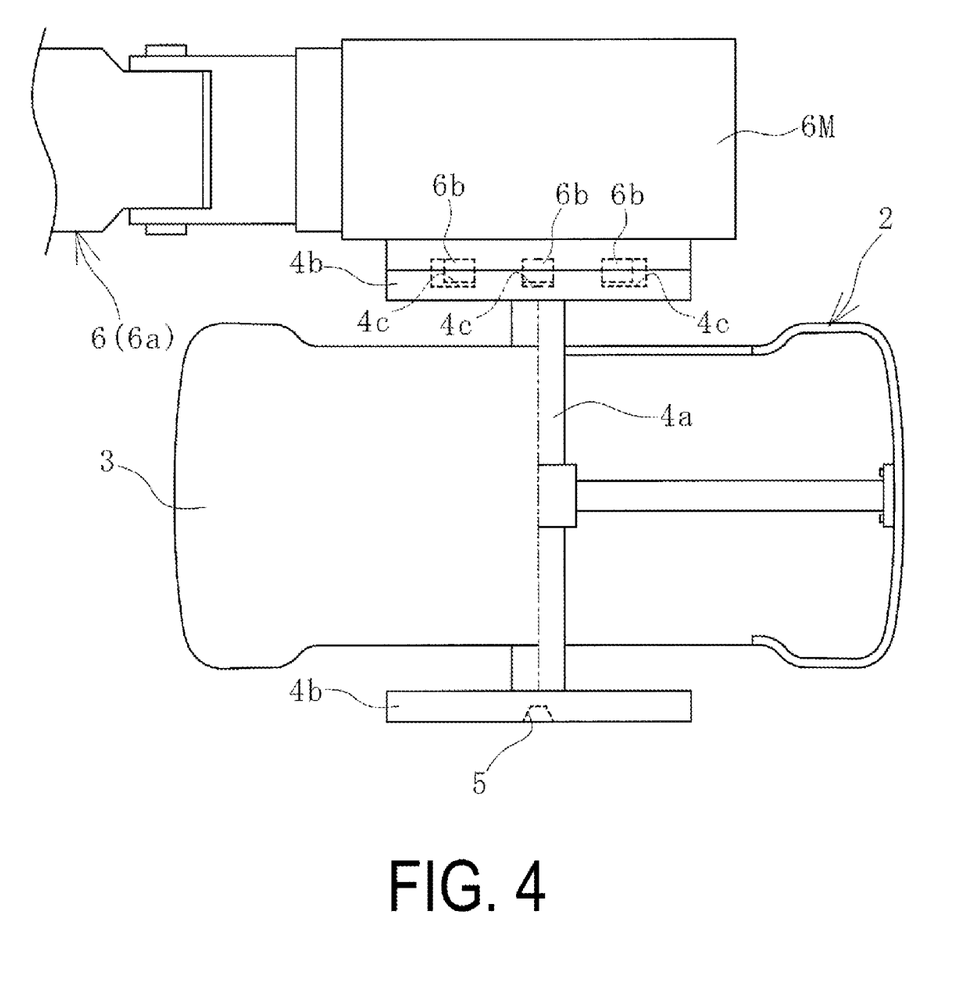
FIG. 4 is an explanatory diagram illustrating an example of a state where the gripping claw and the connecting portion of FIG. 2 are engaged and the forming drum body is held by the robot arm.

The forming drum body 2 exemplified in FIGS. 2 to 4 includes a cylindrical portion 3 and a drum shaft 4a extending in the cylinder axis direction at the center portion of the cylindrical portion 3. FIGS. 2 and 4 each illustrate a right half of the cylindrical portion 3 in a vertical cross-sectional view. The cylindrical portion 3 is composed of an assembly of a plurality of circumferentially divided segments and can be disassembled.

Disk portions 4b are fixed at both end portions of the drum shaft 4a. One of the disk portions 4b includes a connecting portion 4c on its surface, and the other of the disk portions 4b includes an engaging portion 5 on its surface. The connecting portion 4c is gripped by a gripping claw 6b of the robot arm 6 described later. The engaging portion 5 engages with a guide 9a formed in a placement base 9.

The robot arm 6 may be of publicly known various types (so-called industrial robot arms) that are controlled based on programming, teaching and the like to perform desired movements. The robot arm 6 of the present embodiment is provided with a drive motor 6M attached at a tip end of an arm portion 6a that can move to the desired three-dimensional positions, and the gripping claw 6b is installed through the drive motor 6M. The gripping claw 6b is attached to or detached from the connecting portion 4c of the forming drum body 2.

When the drive motor 6M rotationally drives the gripping claw 6b gripping the connecting portion 4c, the forming drum body 2 mounted on the robot arm 6 is rotationally driven about the drum shaft 4a. The drive motor 6M is provided in any manner. In the case where the robot arm 6 has a specification that does not include the drive motor 6M, the gripping claw 6b is directly provided at the tip end portion of the arm portion 6a.

The member supplier 7 supplies to the forming drum body 2 any one of the tire components M (M1 to M5) in each of the operation stations S. Publicly known various member suppliers 7 may be used. Examples of the type of the tire component M include inner liners, carcass layers, side rubbers, reinforcement layers, and tread rubber.

The placement apparatus 8 is used for temporarily placing the forming drum body 2 in the tire forming step. The holding of the forming drum body 2 by the robot arm 6 is released and the forming drum body 2 is placed in the placement apparatus 8 in a sideways state. The forming drum body 2 temporarily placed in the placement apparatus 8 is held by the robot arm 6 and moved to another location (the next operation station S or the like).

Figure 5:
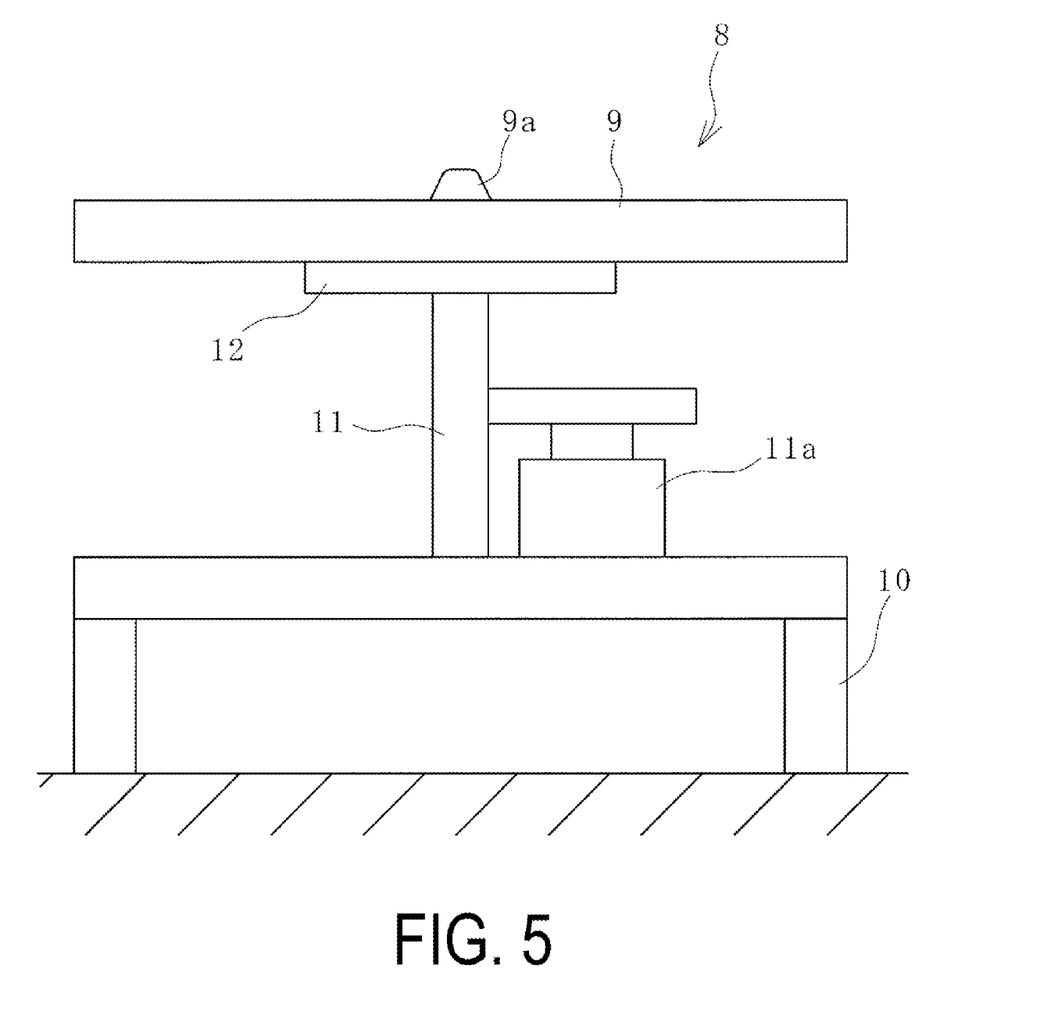
FIG. 5 is an explanatory diagram illustrating in side view an example of a placement apparatus of the forming drum body.
Figure 6:
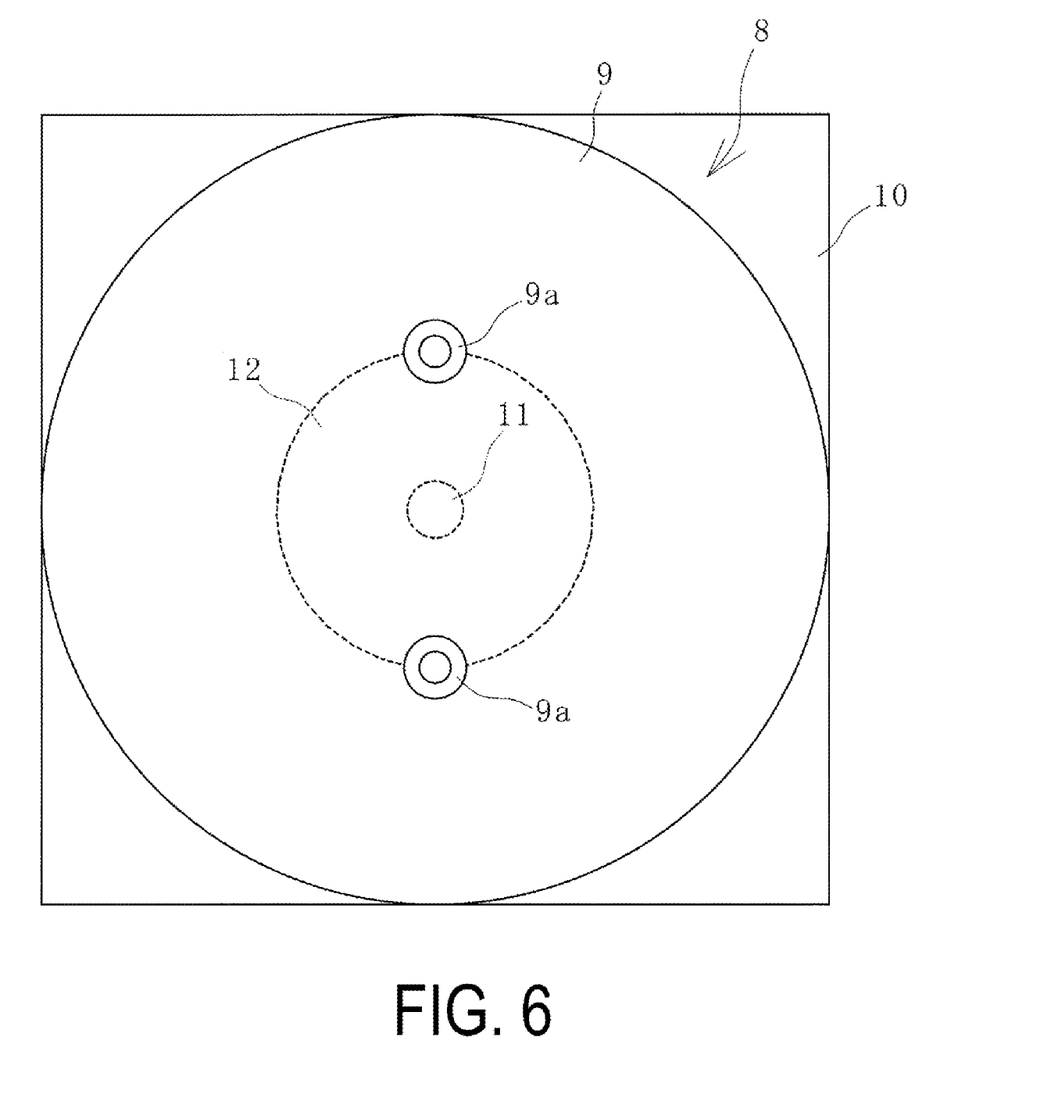
FIG. 6 is an explanatory diagram illustrating in plan view an example of the placement apparatus of FIG. 5.

As exemplified in FIGS. 5 and 6, the placement apparatus 8 includes the placement base 9, and a base portion 10 disposed below the placement base 9. The placement base 9 is supported by a center shaft 11 provided upright at the base portion 10. The center shaft 11 is disposed at a center of the placement base 9 and the base portion 10 in plan view.

The placement base 9 where the forming drum body 2 is placed includes the guide 9a. The placement base 9 may have any shapes with which the forming drum body 2 can be placed in a sideways state. In the present embodiment, a circular plate is used as the placement base 9. The guide 9a is an engaging member that engages with the forming drum body 2, and in the present embodiment, two guides 9a each having a truncated cone shape protruding upward from the top surface of the placement base 9 are placed in two positions 180° opposite each other across the center shaft 11 in plan view. The number of guides 9a is not limited, and, for example, three or four guides 9a may be disposed at even intervals in the circumferential direction about the center shaft 11 in plan view.

The base portion 10 is fixed at a predetermined installation position in an object region (such as the floor in the forming step). The base portion 10 is fixed to the floor with a bolt, for example. In the present embodiment, a box-shaped metal frame is used as the base portion 10, but this is not limitative, and various configurations may be employed. For example, a simple metal base may be employed as the base portion 10. The placement apparatus 8 can be moved by providing a travelling mechanism in the base portion 10.

In the present embodiment, the mass meter 12 and the profile sensor 13 are provided as inspection apparatuses. The predetermined quality of the green tire G during the forming or after completion of the forming is inspected with the inspection apparatuses 12 and 13. Further, the predetermined quality may be inspected as necessary, and the inspection apparatus suitable for the predetermined quality is provided in the manufacturing system 1. In the present embodiment, the mass meter 12 is installed at the bottom surface of the placement base 9, but publicly known various types may be used.

The profile sensor 13 acquires in a noncontact manner the shape of the outermost periphery surface of the tire component M bonded to the forming drum body 2 by using laser light and the like. Publicly known various types may be used as the profile sensor 13.

The profile sensor 13 acquires the shape of the outermost periphery surface of the tire component M over the whole circumferential direction of the forming drum body 2, and therefore, in the present embodiment, a drive motor 11a that rotationally drives the center shaft 11 around its axial core is provided. The placement base 9 is fixed at the upper end of the center shaft 11, and therefore, when the center shaft 11 is rotationally driven, the placement base 9 is rotationally driven together with the center shaft 11. The profile sensor 13 is fixed and installed at a predetermined position away from the placement apparatus 8.

Detection data of the mass meter 12 and the profile sensor 13 is input to the control unit 14. Other various data is input to and stored in the control unit 14 to perform various arithmetic processes. The control unit 14 controls the movements of the placement base 9 (the drive motor 11a), the profile sensor 13 and the like. Various computers may be used as the control unit 14.

The vulcanizing apparatus 15 vulcanizes the green tire G in a vulcanizing mold 16. Publicly known various vulcanizing apparatuses 15 may be used.

Next, an example of a procedure of manufacturing a tire using the manufacturing system 1 is described.

In the tire forming step exemplified in FIG. 1, the robot arm 6 and the placement apparatus 8 are used to sequentially move the forming drum body 2 to the operation station S (S1, S2, S3) as necessary so as to bond the tire component M to the forming drum body 2 as necessary. Through this forming step, the green tire G is formed.

When the forming operation in the first operation station S1 is completed, the forming drum body 2 is moved to the next operation station S2. As such the robot arm 6 holds the forming drum body 2 as exemplified in FIG. 4 and moves the forming drum body 2 to the upper side of the placement apparatus 8. By gripping the connecting portion 4c with the gripping claw 6b, the forming drum body 2 is held by the robot arm 6. The robot arm 6 sets the forming drum body 2 to a sideways state by setting the extending direction of the drum shaft 4a toward the vertical direction such that the engaging portion 5 is located on the lower side.

Next, the robot arm 6 moves the forming drum body 2 to a predetermined position Pa on the upper side of the placement apparatus 8. This predetermined position Pa is set in advance through programming, teaching, and the like, and the robot arm 6 is controlled to move the forming drum body 2 (the axial core position of the drum shaft 4a) to the predetermined position Pa.

Thereafter, the robot arm 6 releases the holding of the forming drum body 2. In this manner, the engaging portion 5 of the forming drum body 2 and the guide 9a of the placement base 9 engage with each other as exemplified in FIG. 7, and the forming drum body 2 is temporarily placed in a sideways state at the placement base 9. The drum shaft 4a is set to a state where it is positioned directly above the center shaft 11.

The forming drum body 2 temporarily placed at the placement base 9 is pulled up to the placement apparatus 8 by the robot arm 6 disposed in the next operation station S2 and is moved to the next operation station S2. At this time, the gripping claw 6b of the robot arm 6 and the connecting portion 4c of the forming drum body 2 are engaged with each other, and the forming drum body 2 is mounted to the robot arm 6.

Likewise in the next operation station S2, the tire component M is bonded to the forming drum body 2 in the same manner. When the forming operation in the operation station S2 is completed and the forming drum body 2 is moved to the next operation station S3, the forming drum body 2 is temporarily placed in the placement apparatus 8 as in the movement between the operation stations S1 and S2.

The robot arm 6 may be configured to have a function of only moving the forming drum body 2 or may be used for the forming operation in addition to such a function. For example, when the held forming drum body 2 is configured to be rotationally driven by the drive motor 6M about the drum shaft 4a as in the present embodiment, it can be used for the forming operation.

Through this forming step, the green tire G is formed at the outer peripheral surface of the forming drum body 2. The green tire G after completion of the forming is moved to the vulcanization step together with the forming drum body 2.

In this forming step, while the forming drum body 2 is temporarily placed in the placement apparatus 8 after completion of the forming operation in any one of operation station S, the predetermined quality (the mass and profile shape) of the green tire G stacked on the outer peripheral surface of the forming drum body 2 during the forming, or the green tire G after completion of the forming is inspected. As such, the inspection of the predetermined quality is performed in a temporary placement period of at least one of the periods of the movement from the operation station S1 to the operation station S2, the movement from the operation station S2 to the operation station S3, and the movement from the operation station S3 and the vulcanization step. The predetermined quality can be inspected in the temporary placement period of all periods, or in the temporary placement period of selected one or two periods.

In the case where the forming drum body 2 is temporarily placed in the placement apparatus 8 during the movement to the vulcanization step after the completion of the forming operation in the last operation station S in the forming step, the inspection of the predetermined quality is performed for the green tire G after the completion of the forming at the outer peripheral surface of the forming drum body 2. On the other hand, in the case where the forming drum body 2 is temporarily placed in the placement apparatus 8 while the forming drum body 2 is moved between the operation stations S1 and S2 or between the operation stations S2 and S3, the inspection of the predetermined quality is performed for the green tire G during the forming formed by the tire component M bonded to the forming drum body 2 before the forming drum body 2 is moved to the next operation station S.

In view of this, when the forming drum body 2 is temporarily placed in the placement apparatus 8, the control unit 14 starts the inspection by running the mass meter 12 and the profile sensor 13. The mass inspection for the green tire G during the forming or after completion of the forming can be promptly completed.

Figure 7:
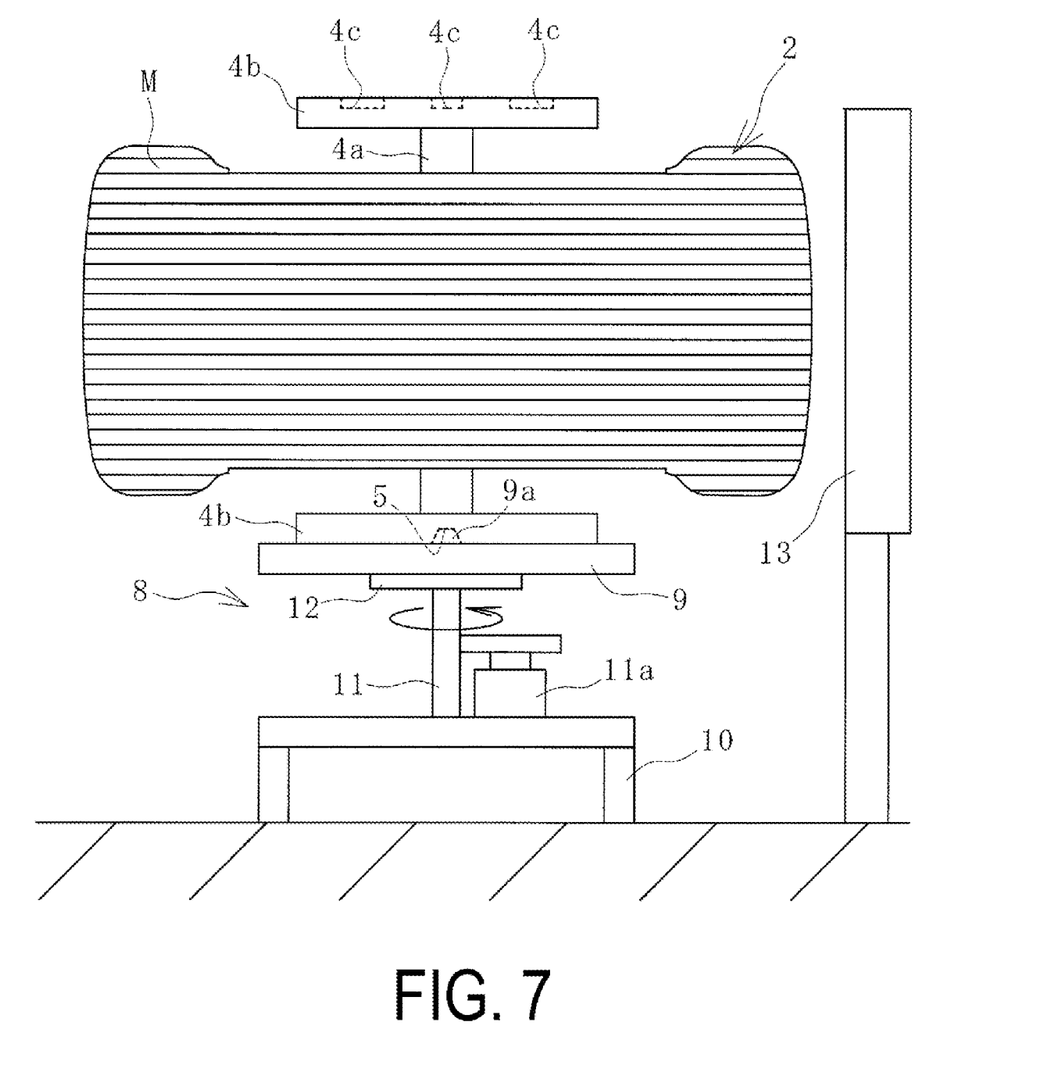
FIG. 7 is an explanatory diagram illustrating an example of a state where a forming drum body is temporarily placed on the placement apparatus of FIG. 5.

In the present embodiment, when inspecting the profile shape of the green tire G during the forming or after completion of the forming, the placement base 9 is rotationally driven together with the center shaft 11 by the drive motor 11a as exemplified in FIG. 7. Since the engaging portion 5 of the forming drum body 2 and the guide 9a of the placement base 9 are engaged with each other, the forming drum body 2 rotates about the drum shaft 4a when the placement base 9 rotates.

In this manner, with the profile sensor 13 fixed at a predetermined position on the outer circumferential side of the green tire G during the forming or after completion of the forming, the forming drum body 2 is rotated about the drum shaft 4a. In this manner, the profile shape is acquired over the whole circumferential direction of the green tire G by using the profile sensor 13. The time taken for the inspection of the profile shape is within one minute or within seconds, for example. The present embodiment only needs to rotate the forming drum body 2 temporarily placed in the placement apparatus 8 without moving the profile sensor 13 in inspecting the profile shape. This has an advantage of a small space required for the inspection.

Figure 8:
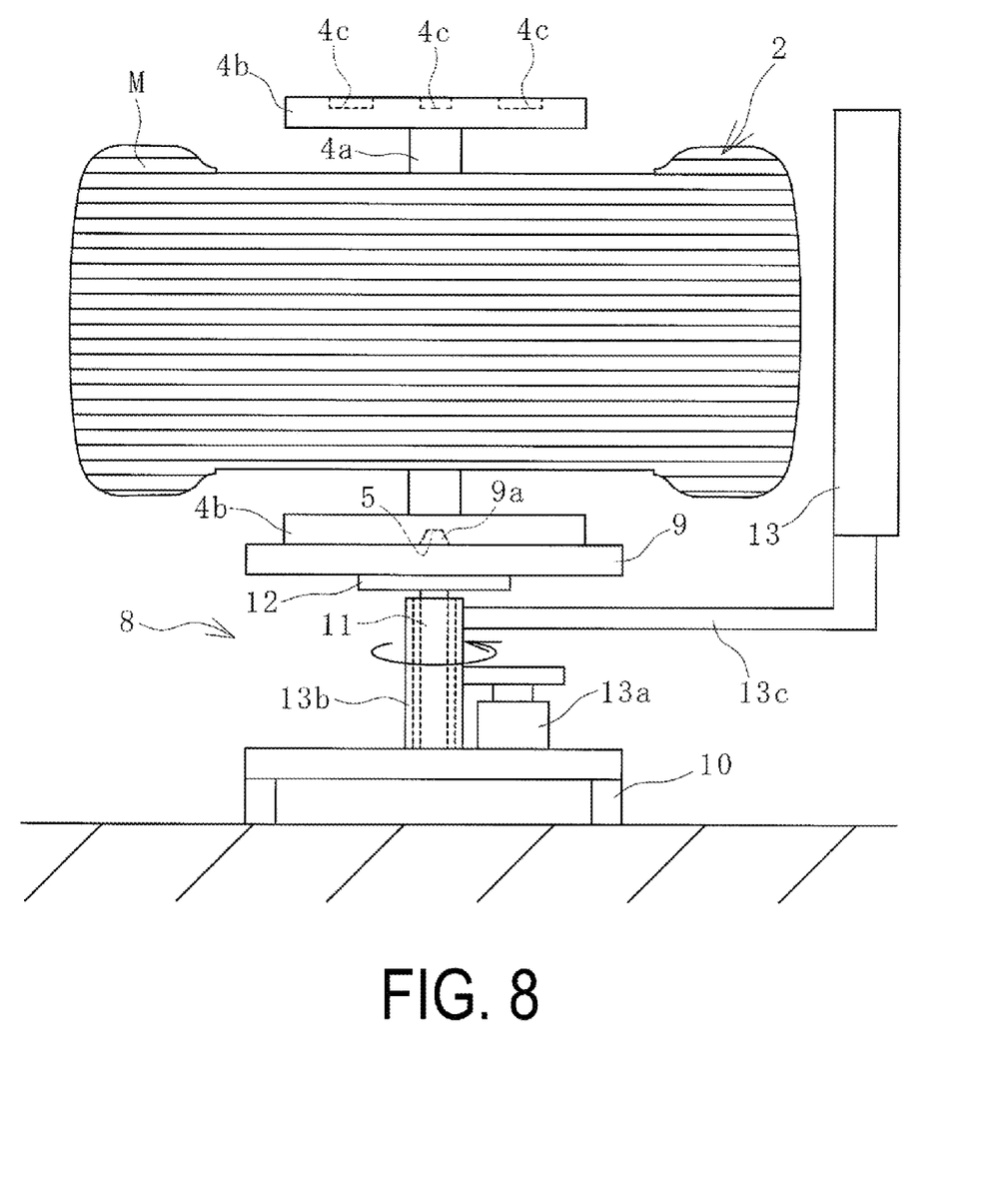
FIG. 8 is an explanatory diagram illustrating a modification of a profile sensor of FIG. 7.

The profile sensor 13 exemplified in FIG. 8 may be used. In the manufacturing system 1 including the profile sensor 13 according to the embodiment, a cylindrical rotating shaft 13b is inserted outside the center shaft 11 of the placement apparatus 8. One end of a coupling arm 13c is joined to the rotating shaft 13b, and the other end of the coupling arm 13c is joined to the profile sensor 13. A drive motor 13a that rotationally drives the rotating shaft 13b about the center shaft 11 is provided.

In the present embodiment, when inspecting the profile shape of the green tire G during the forming or after completion of the forming, the drive motor 13a is rotationally driven by the control unit 14 as exemplified in FIG. 8. Since the profile sensor 13 is coupled with the rotating shaft 13b through the coupling arm 13c, the profile sensor 13 rotates about the drum shaft 4a when the rotating shaft 13b is rotated.

In this manner, in the state where the green tire G during the forming or after completion of the forming is fixed, the profile sensor 13 is rotationally moved on the outer circumferential side of the forming drum body 2 about the drum shaft 4a of the forming drum body 2. In this manner, the profile shape is acquired over the whole circumferential direction of the green tire G by using the profile sensor 13. In the present embodiment, when inspecting the profile shape, the forming drum body 2 temporarily placed in the placement apparatus 8 is not moved or rotated, and thus defects in which the unvulcanized rubber tire component M bonded to the forming drum body 2 is inadvertently deformed less occur.

The inspection result data of the predetermined quality is input to the control unit 14 and is compared with an acceptable range set in advance for the predetermined quality. When the inspection result data is within the acceptable range, the predetermined quality is determined to be acceptable, and the green tire G during the forming or after completion of the forming is moved to the next operation station S (or vulcanization step) together with the forming drum body 2. On the other hand, when the inspection result data is not within the acceptable range, the predetermined quality is determined to be not acceptable, and measures such as modification are performed without moving the green tire G during the forming or after completion of the forming to the next operation station S (or vulcanization step).

Figure 9:
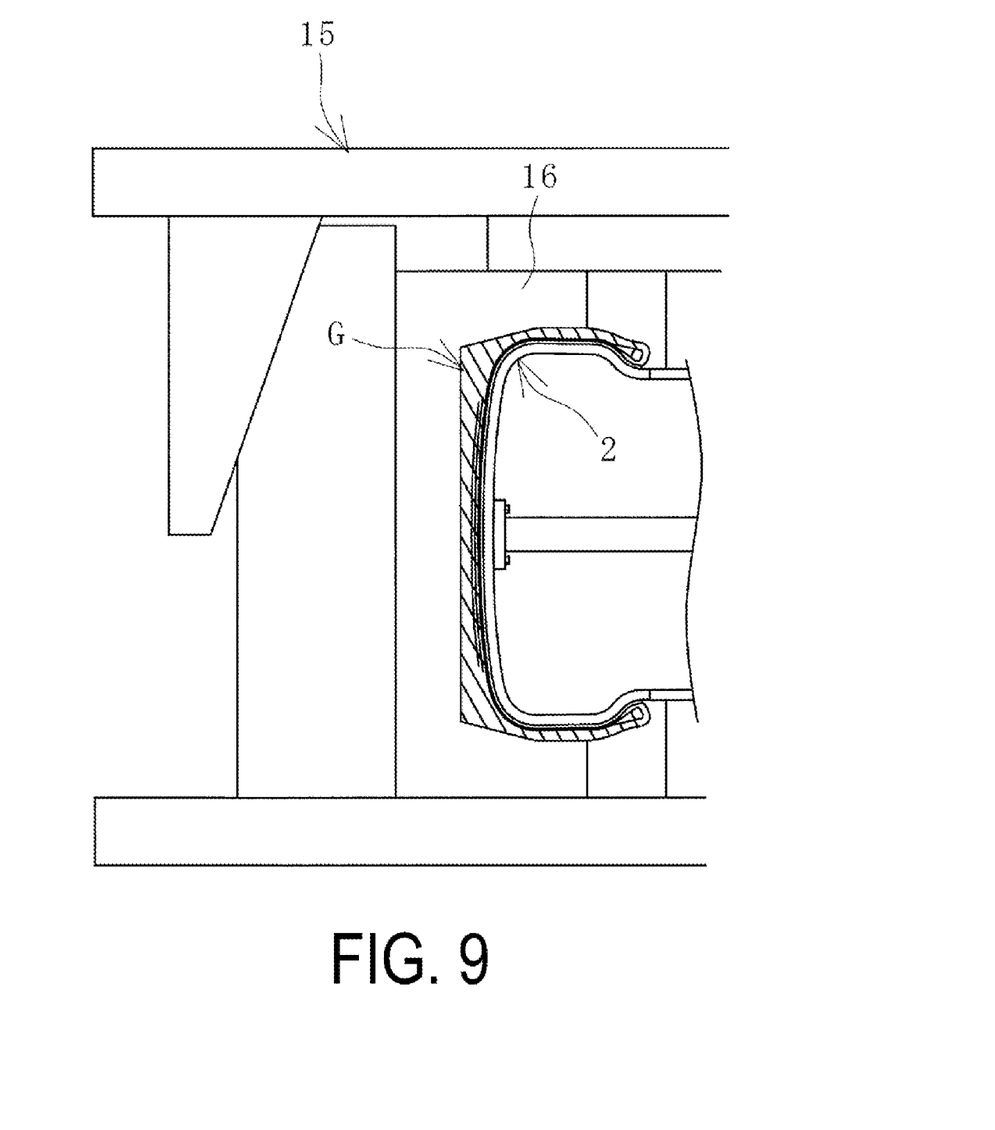
FIG. 9 is an explanatory diagram illustrating an example of a vulcanization step of a green tire in a partially enlarged vertical cross-sectional view.

In the vulcanization step exemplified in FIG. 9, the green tire G after completion of the forming is vulcanized by a publicly known method. The green tire G is disposed together with the forming drum body 2 in the vulcanizing mold 16 mounted to the vulcanizing apparatus 15. Thereafter, the green tire G is vulcanized in the closed vulcanizing mold 16, and thus the tire T is completed. While the pneumatic tire T is manufactured in the present embodiment, the present technology is not limited to the pneumatic tire and may be applied to manufacturing of the tire T of other various types.

As described above, by inspecting the predetermined quality of the green tire G during the forming or after completion of the forming while the forming drum body 2 is temporarily placed in the placement apparatus 8, the temporary placement period can be effectively utilized. Therefore, when the forming drum body 2 is sequentially moved to the plurality of operation stations S to form the green tire G, the green tire G can be efficiently formed while understanding the predetermined quality, which is advantageous in improving the productivity of the tire T. It is also advantageous in determining defects of the green tire G during the forming at an earlier timing. This reduces inappropriate work-in-progress and can reduce waste of materials used and work time and advantageously improve the quality of the tire T.

The invention claimed is:

1. A method of manufacturing a tire, the method comprising:
    forming a green tire by sequentially moving a forming drum body to a plurality of operation stations and bonding a tire component to the forming drum body in each of the operation stations; and
    vulcanizing the green tire;
    the method further comprising:
    temporarily placing, at a placement apparatus, the forming drum body to which the tire component is bonded after completion of a forming operation at any one of the operation stations; and
    inspecting a predetermined quality for a green tire during forming or after completion of the forming while the forming drum body is temporarily placed in the placement apparatus.

2. The method of manufacturing a tire according to claim 1, comprising inspecting, before moving the forming drum body temporarily placed in the placement apparatus to next one of the operation stations, the predetermined quality for the green tire during the forming.

3. The method of manufacturing a tire according to according to claim 1, wherein the predetermined quality is at least one of a mass or a profile shape of the green tire.

4. The method of manufacturing a tire according to claim 3, comprising, in inspecting the profile shape of the green tire, rotating a profile sensor on an outer circumferential side of the green tire about a drum shaft of the forming drum body.

5. The method of manufacturing a tire according to according to claim 3, comprising, in inspecting the profile shape of the green tire, disposing a profile sensor on an outer circumferential side of the green tire and rotating the forming drum body about a drum shaft.

6. A system for manufacturing a tire, the system comprising:
    a forming drum configured to sequentially move to a plurality of operation stations;
    a member supplier disposed in each of the operation stations and configured to supply a tire component to the forming drum body; and
    a vulcanizing apparatus in which a green tire formed through a forming operation in each of the operation stations is vulcanized;
    the system further comprising an inspection apparatus and a placement apparatus in which the forming drum body to which the tire component is bonded after completion of a forming operation in any one of the operation stations is temporarily placed, and
    the inspection apparatus being configured to inspect a predetermined quality of a green tire during forming or after completion of the forming, the green tire being formed by the tire component bonded to the forming drum body temporarily placed in the placement apparatus.

7. The method of manufacturing a tire according to according to claim 2, wherein the predetermined quality is at least one of a mass or a profile shape of the green tire.

8. The method of manufacturing a tire according to claim 7, comprising, in inspecting the profile shape of the green tire, rotating a profile sensor on an outer circumferential side of the green tire about a drum shaft of the forming drum body.

9. The method of manufacturing a tire according to according to claim 7, comprising, in inspecting the profile shape of the green tire, disposing a profile sensor on an outer circumferential side of the green tire and rotating the forming drum body about a drum shaft.

10. The method of manufacturing a tire according to claim 1, wherein the placement apparatus is in a state of being fixed at a predetermined installation position.

11. The method of manufacturing a tire according to claim 1, further comprising:

installing a robot arm in each of the operation stations, installing the placement apparatus near the boundary between the operation stations adjacent to each other, and sequentially moving the forming drum body to a plurality of the operation stations as necessary using the robot arm and the placement apparatus, thereby forming the green tire.

12. The system for manufacturing a tire according to claim 6, wherein the placement apparatus is in a state of being fixed at a predetermined installation position.

13. The system for manufacturing a tire according to claim 6, further comprising:

a robot arm installed in each of the operation stations, and the placement apparatus installed near the boundary between the operation stations adjacent to each other; and the green tire being configured to be formed by sequentially moving the forming drum body to a plurality of the operation stations as necessary using the robot arm and the placement apparatus.

* * * * *